(12) United States Patent
Jansen et al.

(10) Patent No.: US 6,641,904 B1
(45) Date of Patent: Nov. 4, 2003

(54) PROFILED BAR AND USE AND METHOD FOR ITS PRODUCTION

(75) Inventors: Klaus Jansen, Buxtehude (DE);
Christian Gensewich, Braunschweig (DE)

(73) Assignee: Thomas GmbH & Co. Technik & Innovation KG, Bremervorde (DE)

( * ) Notice: Subject to any disclaimer, the term of this patent is extended or adjusted under 35 U.S.C. 154(b) by 64 days.

(21) Appl. No.: 09/638,290

(22) Filed: Aug. 14, 2000

(51) Int. Cl.⁷ .................................................. B32B 27/12
(52) U.S. Cl. ................................ 428/297.4; 428/300.4; 428/359; 428/364; 428/375; 267/81; 267/95
(58) Field of Search ......................... 478/357, 293.7, 478/297.4, 300.4, 359, 364, 375; 267/81, 95, 96, 103, 106

(56) References Cited

U.S. PATENT DOCUMENTS

| | | |
|---|---|---|
| 4,190,996 A | 3/1980 | Schindler |
| 4,983,453 A * | 1/1991 | Beall ........................ 428/294 |
| 5,439,627 A | 8/1995 | De Jager |
| 5,720,471 A * | 2/1998 | Constantinescu ............ 267/81 |

FOREIGN PATENT DOCUMENTS

| | | |
|---|---|---|
| DE | 23 34 132 B2 | 1/1975 |
| DE | 44 28 088 A1 | 2/1996 |
| DE | 196 32 960 A1 | 2/1998 |
| DE | 37 03 910 A1 | 11/1998 |
| RU | 2005752 C1 | 1/1994 |
| WO | WO 97/06942 A1 | 2/1997 |

OTHER PUBLICATIONS

Copy of "Search Report" conducted by the Russian Patent Office on behalf of the Turkish Patent Office.

* cited by examiner

Primary Examiner—Merrick Dixon
(74) Attorney, Agent, or Firm—Technoprop Colton LLC

(57) ABSTRACT

The invention is a profiled bar, in particular sprung bars, in which a reinforcement of both synthetic fibers and natural fibers is embedded in a plastic matrix. The proportion of synthetic fibers can be reduced by using natural fibers derived from regrowing raw materials. This improves environmental compatibility and makes it easier to dispose of such sprung bars. The sprung bars are used in particular to form bottom sprung supports for furniture for sitting and lying on, and in particular for slatted frames.

14 Claims, 3 Drawing Sheets

PROFILED BAR AND USE AND METHOD FOR ITS PRODUCTION

BACKGROUND OF THE INVENTION

1. Technical Field

The invention relates to a profiled bar, in particular a load-bearing, prism-shaped profiled bar. The invention furthermore relates to uses for such a profiled bar and to a method for its production in.

2. Prior Art

The profiled bars referred to here are profiled, elongate objects which in particular can be subjected to high loads and have a defined elasticity. Profiled bars of this type are usually formed from a matrix of thermosetting or thermoplastic material (plastic matrix), the plastic matrix being reinforced by fibres, which is also to be understood as meaning fibre strands. These fibres are usually synthetic fibres, which are relatively expensive. In many cases, the synthetic fibres used are glass and mineral fibres. However, these are not environmentally compatible. In particular, such profiled bars become increasingly difficult to dispose of as the proportion of glass and mineral fibres increase.

BRIEF DESCRIPTION OF THE INVENTION

In view of the above, the invention is based on the object of providing a profiled bar, a method for its production and preferred uses of a profiled bar of this type, with a view to achieving good environmental compatibility, while the other required properties are to be maintained as far as possible.

A profiled bar for achieving this object has the features of claim 1. According to this claim, both synthetic fibres and natural fibres (which is also intended to mean synthetic fibre strands and/or natural fibre strands, without these being expressly mentioned) are provided in the plastic matrix. The synthetic fibres are preferably based on hydrocarbons. These synthetic fibres are easy to dispose of. Natural fibres are generally regarded as environmentally friendly. This is because they can be obtained from regrowing raw materials and can also be disposed of. in an environmentally friendly manner. However, they cannot be subjected to the same level of load as synthetic fibres. The use according to the invention of both types of fibre has shown that, despite the deployment of a certain amount of natural fibres, it is possible to form profiled bars which with regard to the mechanical properties are equivalent to profiled bars which are reinforced-only by synthetic fibres.

According to a preferred refinement of the invention, the synthetic fibres (or synthetic fibre strands) are only assigned to selected cross-sectional areas of the profiled bar, preferably to outer cross-sectional areas. As a result, the synthetic fibres, which have a high tensile strength, are situated at areas of the profiled bar which are subjected to particularly high loads, where they can unfurl their full action. As a result, the particular mechanical properties of the synthetic fibres are utilized to the maximum possible extent. The natural fibres arranged in other cross-sectional areas can then be situated in those cross-sectional areas of the profiled bar which are subjected to lower levels of load, with the result that the natural fibres are only subjected to loads which are within the scope of their lower strength.

It is possible for the natural fibres to be distributed uniformly or non-uniformly over the entire cross-sectional area of the profiled bar which is left free by the synthetic fibres. However, it is also conceivable for the natural fibres likewise only to be assigned to specific cross-sectional areas of the profiled bar, so that the profiled bar has cross-sectional areas which contain neither synthetic fibres nor natural fibres. These may, for example, be central cross-sectional areas of the profiled bar which are substantially free from load. Moreover, by assigning the natural fibres and the synthetic fibres to selected cross-sectional areas, it is possible to achieve targeted spring properties of the profiled bar.

Preferably, at least the synthetic fibres run continuously in the longitudinal direction of the profiled bar, in the form of synthetic fibre strands, i.e. they are generally in the form of endless fibres. By contrast, the natural fibres are generally of endless length. They are therefore preferably twisted into yarns or are used as carded or nonwoven fabric.

If continuous (endless) strands of synthetic fibres are provided in the profiled bar, the individual strands of the plastic fibres are preferably arranged in the plastic matrix without any twisting whatsoever. This makes it easy to impregnate or saturate the synthetic fibre strands with the plastic matrix. Moreover, this imparts improved tensile and flexural strength to the profiled bar.

The synthetic fibre strands are predominantly used entirely as endless strands which extend continuously over the entire length of the profiled bar. However, it is also conceivable to employ a combination or mixture of endless synthetic fibre strands and synthetic fibre strands of finite length, the latter preferably in the form of a carded fabric.

According to a preferred design of the profiled bar according to the invention, the synthetic fibres and the natural fibres are preferably completely embedded in the plastic matrix. In this way, the fibres or fibre strands are protected inside the profiled bar. Furthermore, the synthetic fibres and the natural fibres are impregnated or saturated by the plastic matrix. In this way, the properties of the fibres are optimally utilized and delamination phenomena are effectively avoided.

Natural fibres which may be considered are preferably those which are formed from hemp, flax, sisal, cellulose or ramie. It is also conceivable to use combinations of the said natural fibres. These materials are available in sufficient quantities and at low cost, since they are regrowing raw materials. The said natural products are relatively lightweight, so that they practically do not increase the weight thereof.

Synthetic fibres which may preferably be considered are those based on hydrocarbons, in particular carbon fibres, aramid fibres or aramid combinations, which can be disposed of in an environmentally friendly manner, in particular by thermal recycling, so that they are not significantly contradictory to the desired environmental compatibility. In some cases, they also allow downcycling. The said synthetic fibre materials may also be used in mixed form, for example by carbon fibres and aramid fibres, preferably in each case in the form of strands, being present in the profiled bar. The said synthetic fibres have a relatively high tensile strength, so that partial substitution thereof by natural fibres does not significantly impair the load-bearing capacity and elasticity of the profiled bars.

The plastic matrix may comprise a thermosetting or thermoplastic material. This may be an epoxy system, polyurethane or polyester. It is preferable to use a matrix made from a thermosetting material, which ensures that the profiled bar is easy to produce, in particular that the fibres and fibre strands can be impregnated or saturated successfully.

The profiled bar according to the invention can preferably be used to form sprung bars, in particular those which are used for furniture for sitting and/or lying on and bottom sprung supports for furniture for sitting and/or lying on, preferably slatted frames. With these sprung bars, it is particularly important to achieve good environmental compatibility, since the products for which they are used are increasingly being purchased under consideration of environmental aspects.

According to the invention, the profiled bar may furthermore be used for longitudinal members and/or frames for furniture, in particular for furniture for sitting and/or lying on, preferably beds and/or slatted frames. Finally, it is conceivable for the profiled bar according to the invention to be used to at least partially form frames for rehabilitation aids.

During the production of the profile or the profiled bar, the procedure is such that the synthetic and natural fibres, preferably fibre strands and/or fibre webs, are passed through at least one impregnation member, where they are fed with free-flowing plastics material in order to form the plastic matrix. Passing at least some endless synthetic fibres and natural fibres which are usually of endless length through the impregnation member at the same time leads to the process forces required to pull the fibres through, whether they be in the form of strands or webs or combinations thereof, being absorbed by the endless synthetic fibres which have a high load-bearing capacity, while the natural fibres pass through substantially without being exposed to load or with a lower level of load, and therefore there is no risk of the natural fibres, which have a lower tensile strength, being torn during the production process.

Further subclaims relate to advantageous refinements of the method.

BRIEF DESCRIPTION OF THE DRAWINGS

Preferred exemplary embodiments of the invention are explained in more detail below with reference to the drawing, in which.

DETAILED DESCRIPTION OF THE PREFERRED EMBODIMENTS

Figure 1:
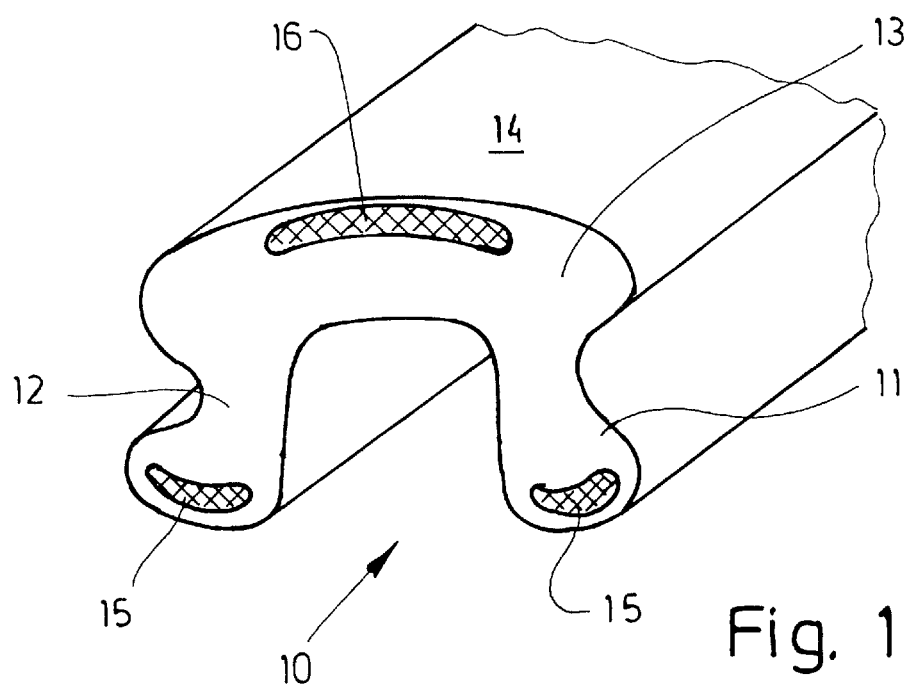
FIG. 1 shows a view of an end side of a sprung bar which is illustrated in part in perspective.
Figure 2:
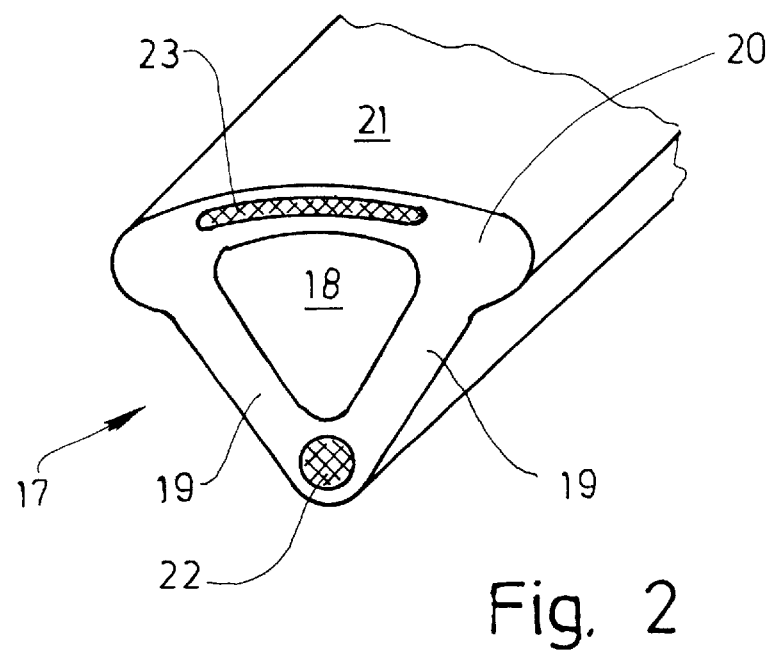
FIG. 2 shows a view of an end side of a sprung bar which is illustrated in part in perspective according to another exemplary embodiment of the invention.
Figure 3:
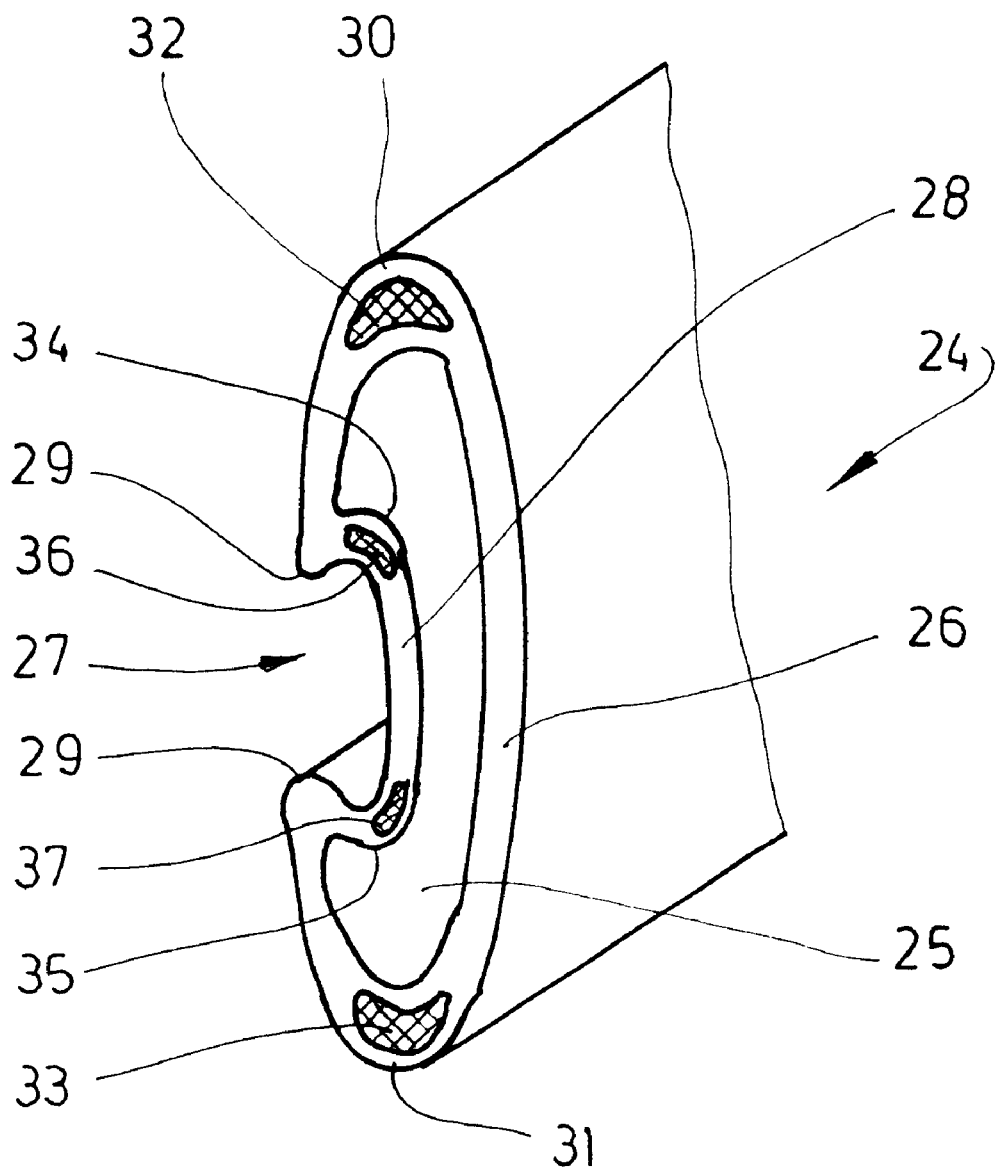
FIG. 3 shows an end view of a longitudinal member which is illustrated in part in perspective.

FIGS. 1 to 3 show possible examples of profiles which are formed according to the invention. These profiles are all distinguished by the fact that they have a reinforcement of synthetic fibres and natural fibres in a plastic matrix.

FIG. 1 shows part of a profiled bar which is designed as a sprung bar 10. The sprung bar 10 is used to form a bottom sprung support for furniture for sitting and lying on, in particular for beds. Preferably, a sprung bar 10 of this type is also used to form a so-called slatted frame for beds or other furniture for lying or sitting on.

The sprung bar 10 shown here is of (inverted) U-shaped profile as seen in cross section. This profile is formed from two parallel, vertical limbs 11 and 12 and a web 13 which connects these limbs 11 and 12. The web 13 connects the top sides of the limbs 11 and 12 and, as a result, at the same time forms a support surface 14 for, for example, the mattress of a bed.

The sprung bar 10 is formed from various materials, specifically a plastic matrix and fibres and/or fibre strands for reinforcing the latter. According to the invention, different fibres are used, specifically, firstly, synthetic fibre strands and, secondly, natural fibres, i.e., in very general terms, synthetic and natural fibres.

The synthetic fibre strands are only assigned to selected cross-sectional areas of the sprung bar 10, specifically to a bottom free end area 15 of each limb 11 and 12 and a central, upper region 16 of the web 13 just below the support surface 14. The end areas 15 and the area 16 are areas of the sprung bar 10 which are subjected to particularly high loads, where the high load-bearing capacity of the synthetic fibres is required and, as a result, the tensile strength provided by the synthetic fibres is utilized to a very great extent. A plurality of endless synthetic fibre strands are arranged both in the end areas 15 and in the area 16. The synthetic fibre strands are preferably used as untwisted individual strands, in particular as rovings.

In the exemplary embodiment shown in FIG. 1, the end areas 15 and the area 16 are flat or kidney-shaped in cross section. This shape can be formed by the arrangement of the individual, untwisted endless strands of the synthetic fibres. However, it is also conceivable, when using twisted strands of the synthetic fibres, to form the cross section of the end areas 15 and of the area 16 by a plurality of adjacent yarns comprising a large number of twisted individual strands. The relatively broad upper area 16 is preferably also formed from correspondingly arranged individual strands. However, it may also be formed from one or more layers of a flat woven fabric, a carded fabric or a nonwoven fabric comprising synthetic fibres.

Natural fibre strands are arranged in the plastic matrix outside the end areas 15 and the area 16. These are not shown in more detail in FIG. 1. The natural fibre strands are strands of finite length which are preferably distributed over the entire remaining cross-sectional area of the sprung bar 10, namely the residual cross-sectional area of the sprung bar 10 which is left free by the end areas 15 and the area 16 of synthetic fibres, and this distribution is preferably in a substantially uniform array. However, it is also conceivable to assign the natural fibre strands to only part of the residual cross-sectional area of the sprung strip 10 which has been left free by the synthetic fibre strands. It is also conceivable to vary the distance between the individual, adjacent natural fibre strands over the residual cross-sectional area of the sprung bar 10, for example in such a manner that it increases towards outer surfaces of the sprung bar 10 and decreases towards the inner core of the sprung bar 10.

FIG. 2 shows a sprung bar 17 which is designed as a hollow profile. Accordingly, there is a closed cavity 18 inside the sprung bar 17. This cavity 18 is surrounded by two side walls 19 which run towards one another in the shape of a V and are connected to one another at the bottom side of the sprung bar 17, and a slightly curved top wall 20. The top side of the top wall 20 once again forms a support surface 21 for a mattress or the like.

A lower area 22 of the sprung bar 17, specifically the area where the side walls 19 running towards one another in the shape of a V meet, is of circular form and is provided with synthetic fibres. In the top wall 20 there is a flat area 23 comprising synthetic fibres which are once again just below the top wall 20 and in the central area of the top wall 20 extend approximately over the entire width of the cavity 18.

The lower, approximately circular area 22 is formed by a round bundle of individual, endless synthetic fibre strands. However, it is also conceivable to provide a carded fabric or a braid of synthetic fibre strands in the circular area 22. The flat, upper area 23 may be formed by a corresponding arrangement of adjacent, individual synthetic fibre strands, which are preferably also endless strands. However, it is also conceivable to use adjacent ropes of synthetic fibres to form the upper, flat area 23. Finally, the flat upper area 23 may also comprise a single-layer or multilayer nonwoven fabric or at least one woven fabric web, which are in each case formed from synthetic fibres or synthetic fibre strands. In the case of the nonwoven fabric, it is possible to use short synthetic fibre sections which are oriented in any desired way.

In the case of the sprung bar 17 too, the residual cross-sectional area which is not occupied by the areas 22 and 23 is filled up by natural fibre strands, preferably of finite length, which are arranged in the plastic matrix. The natural fibre strands are preferably twisted, in the form of a carded fabric, rope or nonwoven fabric. In order to meet the demands imposed, they may be distributed over the residual cross-sectional area and oriented correspondingly in the plastic matrix, specifically, for preference, in such a manner as that which has been described in more detail above in connection with the sprung bar 10 from FIG. 1.

In the sprung bars 10 and 17, the plastic matrix may comprise either a thermosetting or a thermoplastic material. Polyurethane, polyester or an epoxy system are preferably considered.

The synthetic fibres or synthetic fibre strands in the area 15, 16, 22 and 23 are preferably formed from synthetic fibres based on hydrocarbons, such as for example carbon fibres, aramid fibres or other endless polymer fibres. It is possible to use different synthetic fibres or synthetic fibre strands based on hydrocarbons in the sprung bar 10 or 17, specifically in such a manner that either the end areas 15 or the area 16 are formed from different synthetic fibres. However, it is also conceivable to provide different synthetic fibres within one area 15 or 16. It is also possible, in the case of the sprung bar 17, to use different synthetic fibres per area in the areas 22 and 23 or within a single area 22 or 23.

The natural fibres which are arranged uniformly or non-uniformly over the entire residual cross-sectional area or the natural fibre strands which are distributed over only part of the residual cross-sectional area are natural fibres of finite length comprising regrowing raw materials, specifically flax, hemp, sisal or ramie. It is also possible to use cellulose fibres which are based on regrowing raw materials. It is preferable to arrange natural fibres or natural fibre strands made from the same material, for example hemp or one of the other materials listed, within the sprung bar 10 or 17. However, it is also conceivable for natural fibre strands comprising different materials, for example hemp, flax, ramie, sisal and/or cellulose, within a single sprung bar 10 or 17.

The areas 15 and 16, 22 and 23 run continuously in the longitudinal direction of the sprung bars 10 and 17. This applies in particular to all or, if appropriate, only some of the endless synthetic fibre strands arranged in these areas 15, 16, 22 and 23, provided that they do not form a woven fabric, nonwoven fabric, braid or a carded fabric comprising synthetic fibres of finite and/or infinite length. The natural fibres which are of only finite length and are situated outside the areas 15, 16, 22 and 23 likewise run continuously in the longitudinal direction of the sprung bars 10 and 17. However, the natural fibres are not formed from a continuous strand, but rather from a braid, a carded fabric, a woven fabric or a nonwoven fabric.

FIG. 3 shows a profiled bar which is a part of a longitudinal member 24 for furniture for sitting or lying on, in particular beds. However, the longitudinal member 24 can also be used to form an outer frame for a slatted frame. By way of example, the sprung bars 10 or 17 may be supported by the longitudinal member 24.

The longitudinal member 24 is approximately C-shaped in profile. The longitudinal member 24 is designed as a hollow body, i.e. it has a cavity 25, which is likewise approximately C-shaped in profile, in its interior. The longitudinal member 24 has a continuous outer wall 26 which has an opening 27 on one side. The opening 27 is closed off by a small inner wall 28, which is likewise approximately in the shape of a C. The inner wall 28 is integrally connected to parallel end strips 29 of the opposite sides of the opening 27 in the outer wall 26.

An upper curved section 30 and a lower curved section 31 of the outer wall 26 of the longitudinal member 24 are each provided with an area 32 and 33 which is kidney-shaped in cross section and in which endless synthetic fibres or synthetic fibre strands are arranged. Furthermore, an upper end section 34 and a lower end section 35 of the inner wall 28 have areas 36 and 37 comprising endless synthetic fibres or synthetic fibre strands. The areas 32, 33, 36 and 37 run continuously in the longitudinal direction of the longitudinal member 24. The areas 32, 33, 36 and 37 extend over part of the cross section of the longitudinal member 24. The residual area of the cross section (residual cross section) of the longitudinal member 24, which is not occupied by the areas 32, 33, 36 and 37, is provided with natural fibres or natural fibre strands of finite length, which are not shown in FIG. 3. They may be distributed uniformly or non-uniformly over the entire residual area. However, it is also conceivable for natural fibres or natural fibre strands to be assigned to only selected parts of the residual cross section of the longitudinal member 24.

The natural fibre strands run continuously in the longitudinal direction of the longitudinal member 24, preferably as carded fabrics, braids, ropes or the like. In the longitudinal member 24 too, the natural fibre strands are formed from natural materials, namely those which have been mentioned in connection with the sprung bars 10, 17 described above.

The synthetic fibre strands are preferably untwisted in the areas 32, 33, 36 or 37 of the longitudinal member 24. However, they may also be completely or partially twisted, for example by being in the form of yarns, webs or non-woven fabrics. Suitable synthetic fibres for the synthetic fibre strands in the areas 32, 33, 36 and 37 are in particular carbon fibres or aramid fibres or aramid combinations. Mixtures of the abovementioned materials are also conceivable. Preferably, only carbon fibres or carbon fibre strands are arranged in the areas 32 and 33, while aramid fibres and/or aramid fibre strands are incorporated in the areas 36 and 37.

The plastic matrix in which the synthetic fibres and natural fibres are embedded may comprise a thermosetting or thermoplastic material. preferably polyurethane, polyester or an epoxy system.

In all the profiles shown, namely the sprung bars 10 and 17 and the longitudinal member 24, the natural fibres and the synthetic fibres or strands thereof are saturated by the plastic matrix and are fully embedded therein. The synthetic and natural fibre strands, unless they are twisted or held together in some other way, are arranged next to one another with greater or lesser distances between them, so that the synthetic fibre strands and the natural fibre strands are all or at least for the most part completely surrounded by the plastic matrix and impregnated thereby.

As an alternative to the sprung bars 10 and 17 and the longitudinal member 24 shown here, the invention is also suitable for profiled bars of any desired shape and cross section, specifically including those which are used for building frames, in particular for rehabilitation equipment.

Figure 4:
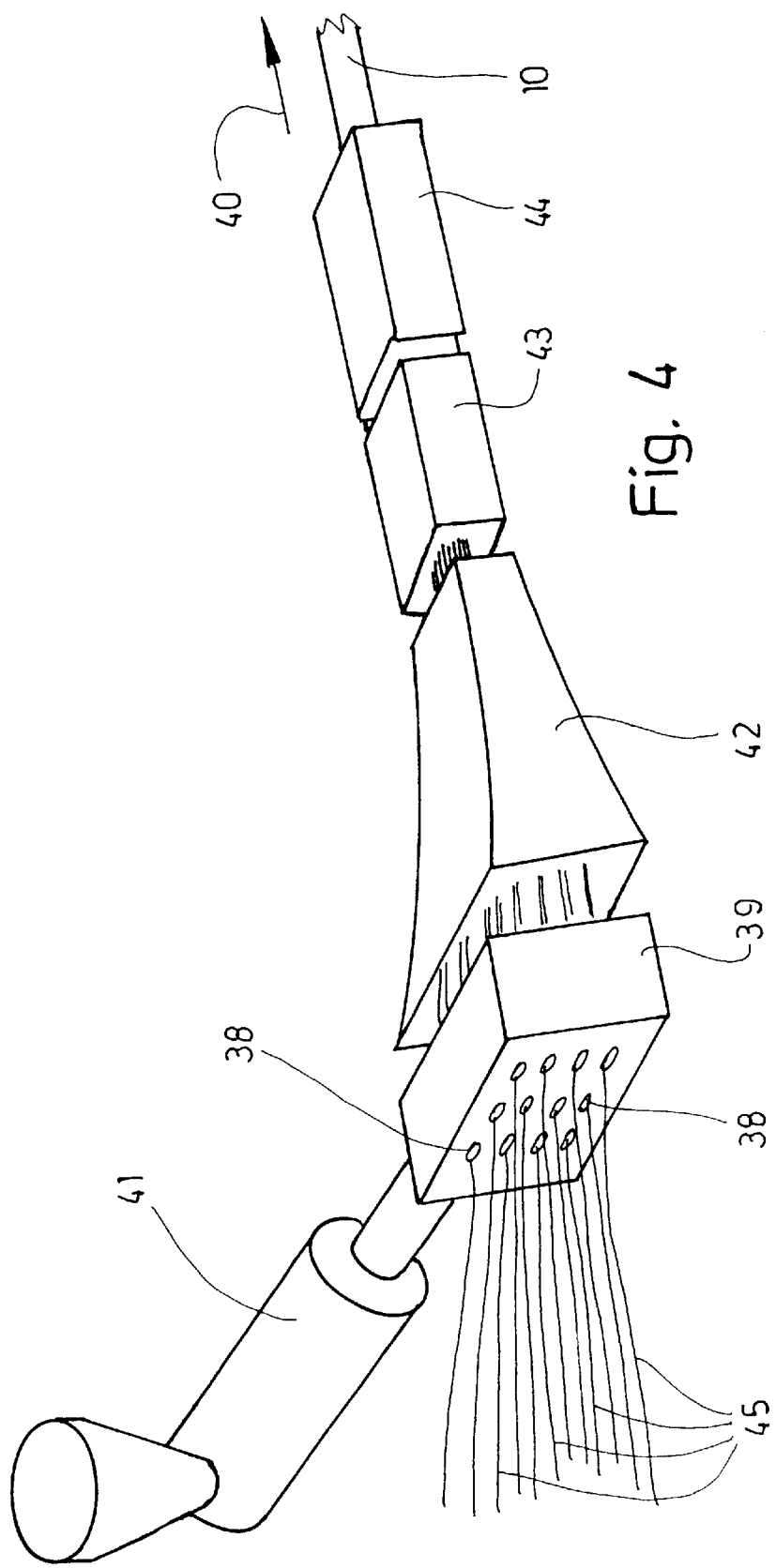
FIG. 4 shows a diagrammatic, perspective illustration of a device for producing, for example, a sprung bar using the method according to the invention.

The sprung bars 10 and 17 and the longitudinal member 24, as well as other profiled bars or profiled rods according to the invention, are preferably produced by so-called pultrusion. An example of a preferred method for producing the sprung bar 10 is explained with reference to the device shown in FIG. 4:

Individual strands 45 of untwisted, endless synthetic fibre strands and carded fabrics of natural fibres are pulled off stock reels (not shown) and are passed through guides in the manner of passage orifices 38 in an impregnation member, namely an impregnation mould 39. This takes place in the manufacturing direction 40 of the sprung bar 10 which is indicated by an arrow.

The plastic matrix, which has been made free-flowing by heating by an extruder 41, for example, is injected into the impregnation mould 39 from the side, from the extruder 41. The result is initial impregnation of the synthetic fibre strands and the natural fibre strands with the material of the plastic matrix which has been made free-flowing by heating.

All the strands 45, namely both the synthetic fibre strands and the natural fibre strands, are fed to the impregnation mould 39, namely the passage orifices 38 thereof, in an orientation which is such that the synthetic fibre strands of the sprung bar 10 pass to the end areas 15 and the areas 16 during the further production of this bar. The other strands which are fed to the impregnation mould 39 are natural fibre strands which then fill up the residual cross section or residual cross-sectional area of the sprung bar 10.

On leaving the impregnation mould 39, the natural fibre strands and synthetic fibre strands which have been provided with liquid plastics material from the plastic matrix are drawn through a second impregnation member, namely an impregnation section 42. The impregnation section 42 is heated by convection or radiation. The impregnation section 42 tapers in the manufacturing direction 40, with the result that the natural fibre strands and synthetic fibre strands which have been wetted and impregnated with the plastic matrix are brought together.

A heated mould 43 is provided downstream of the impregnation section 42, in which mould the sprung bar 10 is to a very large extent given its intended profile. In the process, the synthetic fibre strands also pass into the end areas 15 and the area 16.

On leaving the mould 43, the sprung bar 10 is passed through a cooling section 44, in which the plastic matrix is cooled. Final shaping of the sprung bar 10 can take place in this cooling section 44, in such a manner that its profile is calibrated and the surface is defined, in particular smoothed.

A finished profiled strand emerges from the cooling section 44, from which strand a sprung bar 10 is formed by cutting the strand to a suitable length.

In the manufacturing direction 40, initially only the synthetic fibre strands and the natural fibre strands, and later also the material of the plastic matrix, are drawn through the impregnation mould 39, the impregnation section 42, the mould 43 and the cooling section 44, specifically by caterpillar-type drives (not shown) which engage on the finished profile of the sprung bar 10 downstream of the cooling section 44. In the process, the endless synthetic fibre strands absorb the process forces required to pull the individual materials through the various components of the device. Consequently, the natural fibre strands of finite length, which have a lower tensile strength, do not have to transmit the process forces, and therefore remain substantially free from load during production of the sprung bar 10, so that they cannot tear during the above-described operation of producing the sprung bar 10.

It is possible for other profiles, profiled bars or profiled strands according to the invention to be produced in the same way as the sprung bar 10 from natural fibres and synthetic fibres or strands thereof which are embedded in a plastic matrix.

What is claimed is:

1. A load bearing, prism-shaped profiled bar, having a plastic matrix and fibres arranged therein, characterized in that the fibres are synthetic fibres and natural fibres, wherein, the synthetic fibres are assigned to selected cross-sectional areas, the natural fibres are assigned to cross-sectional areas that are left free by the synthetic fibres, the synthetic fibres are assigned to different cross-sectional areas from the natural fibres, and the synthetic fibres and the natural fibres are completely embedded in the plastic matrix.

2. Profiled bar according to claim 1, characterized in that the synthetic fibres are assigned to outer cross-sectional areas.

3. Profiled bar according to claim 1, characterized in that at least some of the synthetic fibres are formed as strands (5) which are endless and continuous in the longitudinal direction.

4. Profiled bar according to claim 1, characterized in that the synthetic fibres and the natural fibres are completely embedded in the plastic matrix.

5. Profiled bar according to claim 1, characterized in that the synthetic fibres are formed from fibres based on hydrocarbons.

6. Profiled bar according to claim 1, characterized in that the natural fibres are selected from the group consisting of hemp, flax, sisal, ramie, cellulose, and combinations thereof.

7. Use of a profiled bar according to claim 1 for forming sprung bars (10, 17) for bottom sprung supports for furniture for lying on.

8. Use of a profiled bar according to claim 1 fork forming longitudinal members (24) for furniture for lying on.

9. A load bearing, prism-shaped profiled bar, having natural fibres and synthetic fibres arranged in a plastic matrix, characterized in that:
   a. the synthetic fibres are assigned to selected outer cross-sectional areas of the profiled bar;
   b. the natural fibres are assigned to other selected cross-sectional areas of the profiled bar, different from the selected cross-sectional areas in which the synthetic fibres are assigned and free of the synthetic fibres; and
   c. the synthetic fibres and the natural fibres are completely embedded in the plastic matrix.

10. The profiled bar as claimed in claim 1, characterized in that the natural fibres are selected from group consisting of hemp, flax, sisal, ramie cellulose, and combinations thereof.

11. The profiled bar as claimed in claim 10, characterized in that at least some of the synthetic fibres are formed as strands which are endless and continuous in the longitudinal direction.

12. The profiled bar as claimed in claim 11, characterized in that the synthetic fibres are formed from fibres based on hydrocarbons.

13. Use of a profiled bar according to claim 12 for forming sprung bars for bottom sprung supports for furniture for lying on.

14. Use of a profiled bar according to claim 12 for forming longitudinal members for furniture for lying on.

* * * * *